(12) United States Patent
Smith et al.

(10) Patent No.: US 9,079,658 B2
(45) Date of Patent: Jul. 14, 2015

(54) VORTEX GENERATION DEVICE

(75) Inventors: Brian R. Smith, Colleyville, TX (US);
Patrick J. Yagle, Fort Worth, TX (US)

(73) Assignee: Lockheed Martin Corporation,
Bethesda, MD (US)

( * ) Notice: Subject to any disclaimer, the term of this patent is extended or adjusted under 35 U.S.C. 154(b) by 957 days.

(21) Appl. No.: 12/869,884

(22) Filed: Aug. 27, 2010

(65) Prior Publication Data

US 2012/0049001 A1    Mar. 1, 2012

(51) Int. Cl.
*B64C 1/38*        (2006.01)
*B64C 23/06*       (2006.01)

(52) U.S. Cl.
CPC ........................... *B64C 23/06* (2013.01)

(58) Field of Classification Search
USPC ............... 244/130, 200, 200.1, 199.1, 198
See application file for complete search history.

(56) References Cited

U.S. PATENT DOCUMENTS

| 3,419,232 | A | * | 12/1968 | McStay et al. ............... 244/119 |
| 3,578,264 | A | * | 5/1971 | Kuethe .................... 244/200.1 |
| 4,067,518 | A | | 1/1978 | Paterson et al. |
| 4,264,043 | A | * | 4/1981 | Walker .......................... 102/384 |
| 4,718,620 | A | * | 1/1988 | Braden et al. ................. 244/130 |
| 4,736,913 | A | * | 4/1988 | Bennett et al. ................ 244/130 |
| 4,932,612 | A | * | 6/1990 | Blackwelder et al. ........ 244/207 |
| 5,058,837 | A | | 10/1991 | Wheeler |
| 5,069,402 | A | * | 12/1991 | Wortman ...................... 244/130 |
| 5,988,568 | A | * | 11/1999 | Drews .......................... 244/200 |
| 6,446,908 | B1 | * | 9/2002 | Saiz ............................. 244/45 R |
| 6,669,142 | B2 | | 12/2003 | Saiz |
| 6,715,717 | B2 | | 4/2004 | Dixon et al. |
| 6,957,792 | B2 | * | 10/2005 | Saiz ................................ 244/36 |
| 7,165,627 | B2 | * | 1/2007 | Hutter et al. .................... 169/53 |
| 8,226,038 | B2 | * | 7/2012 | Smith et al. .................... 244/130 |
| 2010/0187359 | A1 | * | 7/2010 | Rawlings et al. ............. 244/130 |
| 2010/0187360 | A1 | * | 7/2010 | Rawlings et al. ............. 244/130 |
| 2011/0180146 | A1 | * | 7/2011 | Smith et al. ....................... 137/1 |
| 2011/0198444 | A1 | * | 8/2011 | Dong ............................ 244/130 |

* cited by examiner

*Primary Examiner* — Philip J Bonzell
(74) *Attorney, Agent, or Firm* — Reising Ethington P.C.

(57) ABSTRACT

A vortex generation device for reducing drag on an upswept aircraft fuselage afterbody and including a vortex generator vane that extends longitudinally from along an outer mold line of the fuselage of an aircraft adjacent an upswept afterbody of the fuselage and that is configured and positioned to reduce drag on an upswept aircraft fuselage afterbody by developing vortices that counteract vortices generated along such an upswept fuselage afterbody. The vane is disposed aft of a side paratrooper jump door of the aircraft fuselage and has a spine and leading end that are faired smoothly into the mold line of the fuselage.

22 Claims, 4 Drawing Sheets

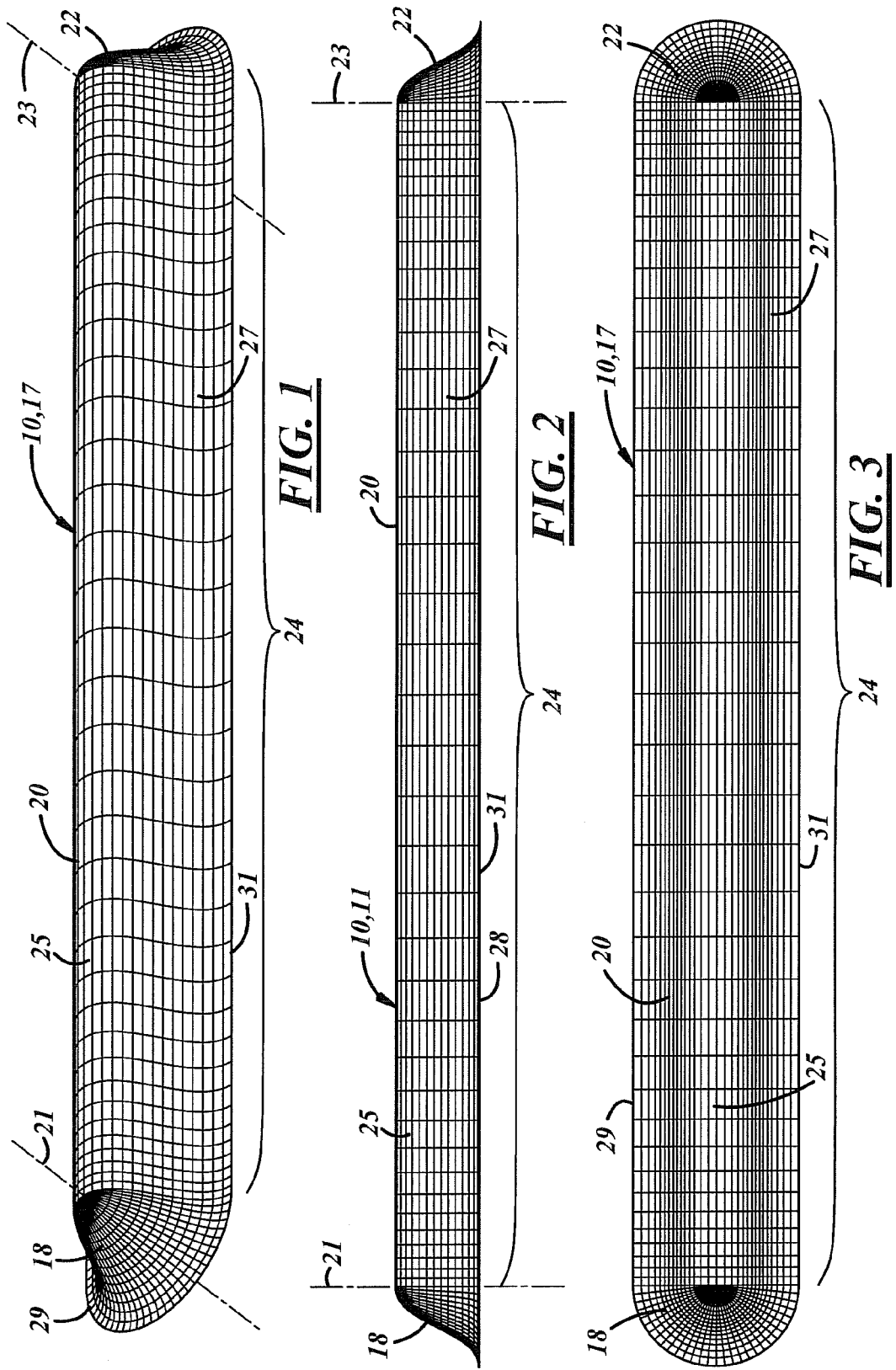

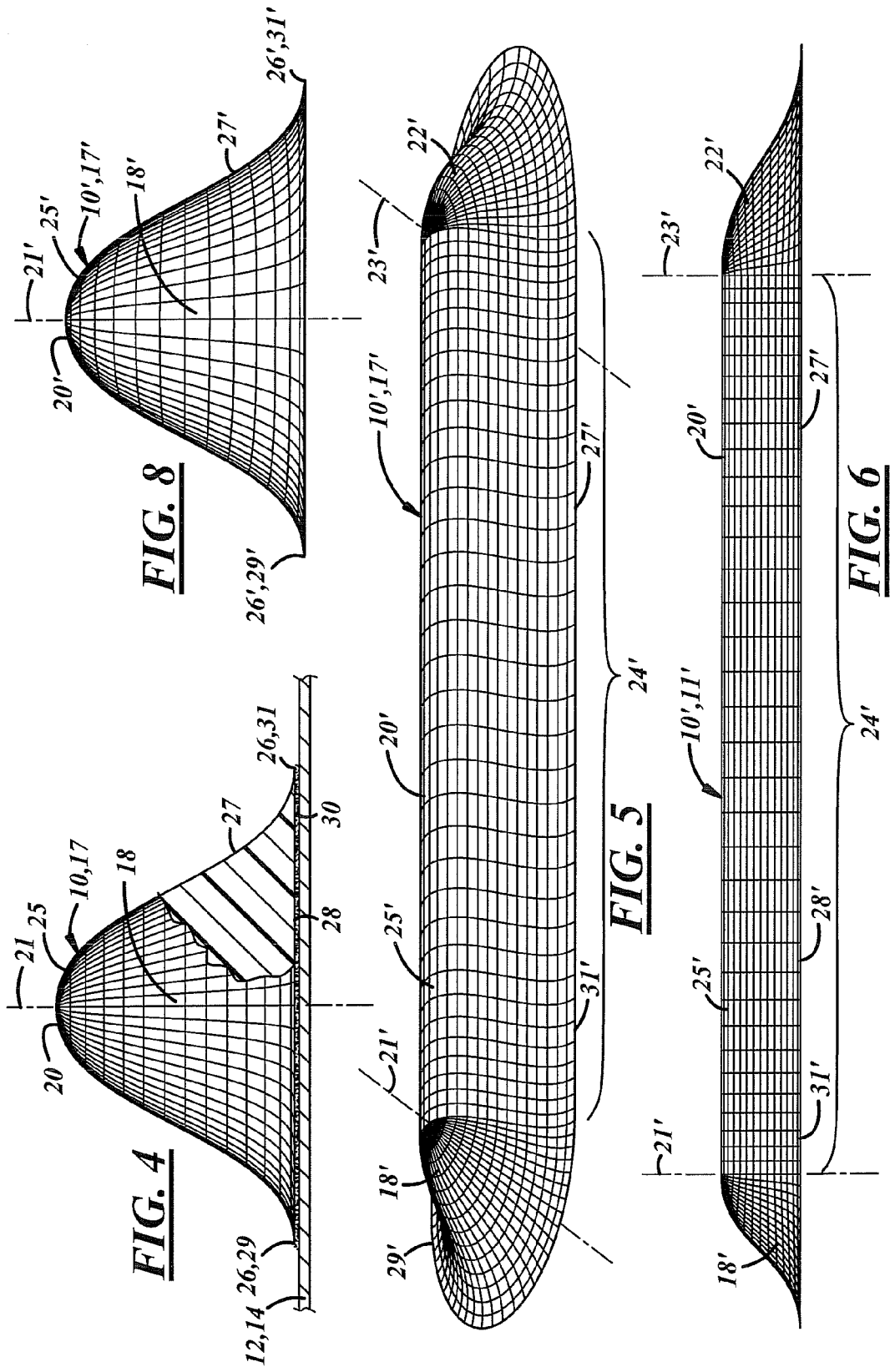

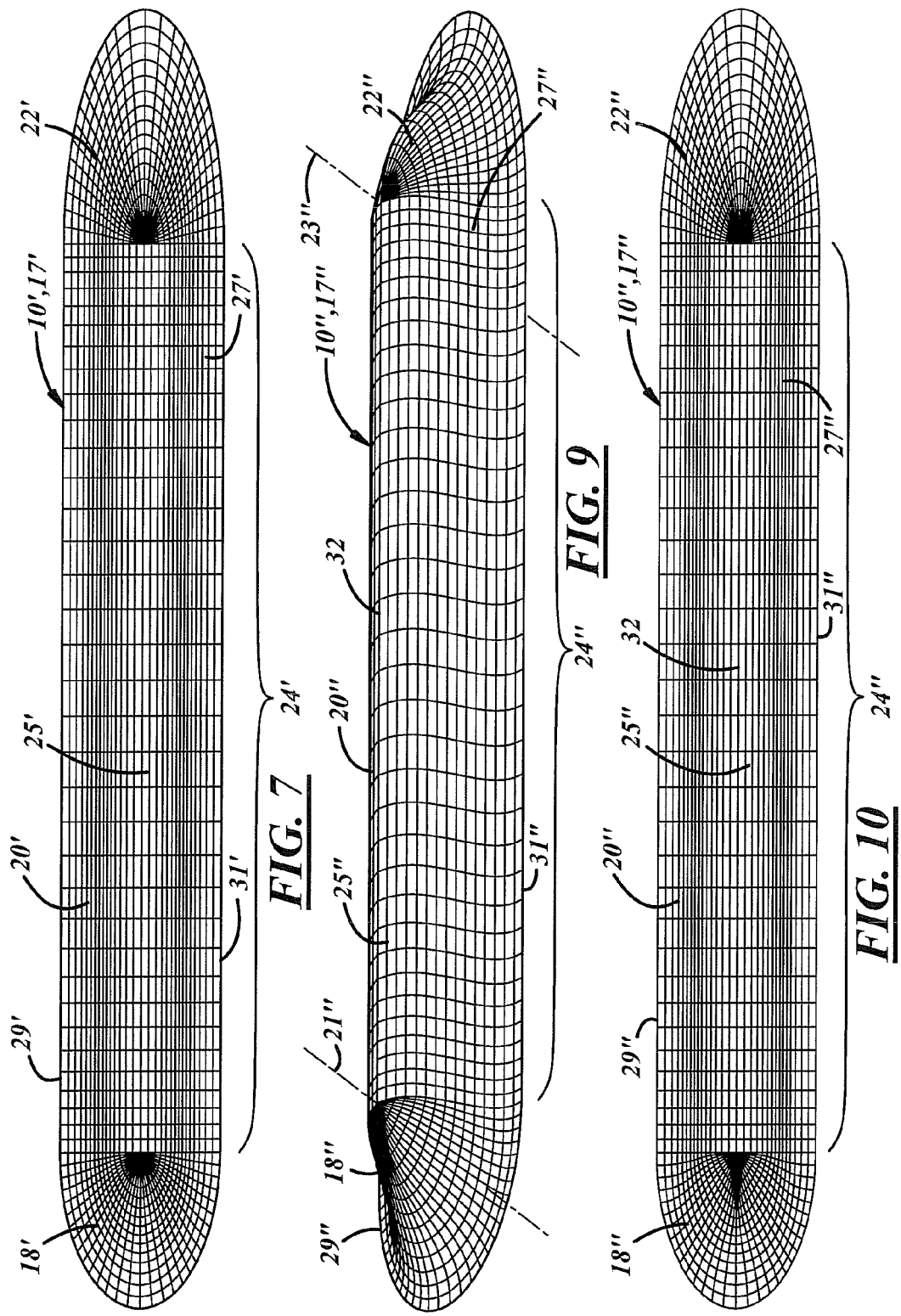

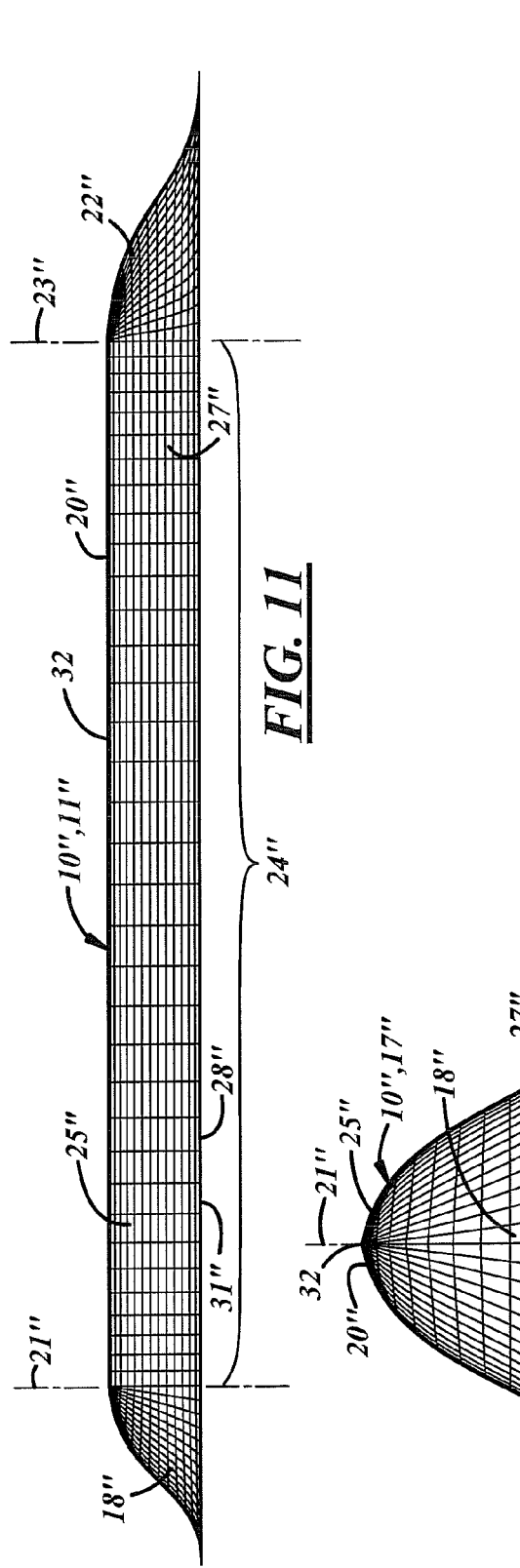
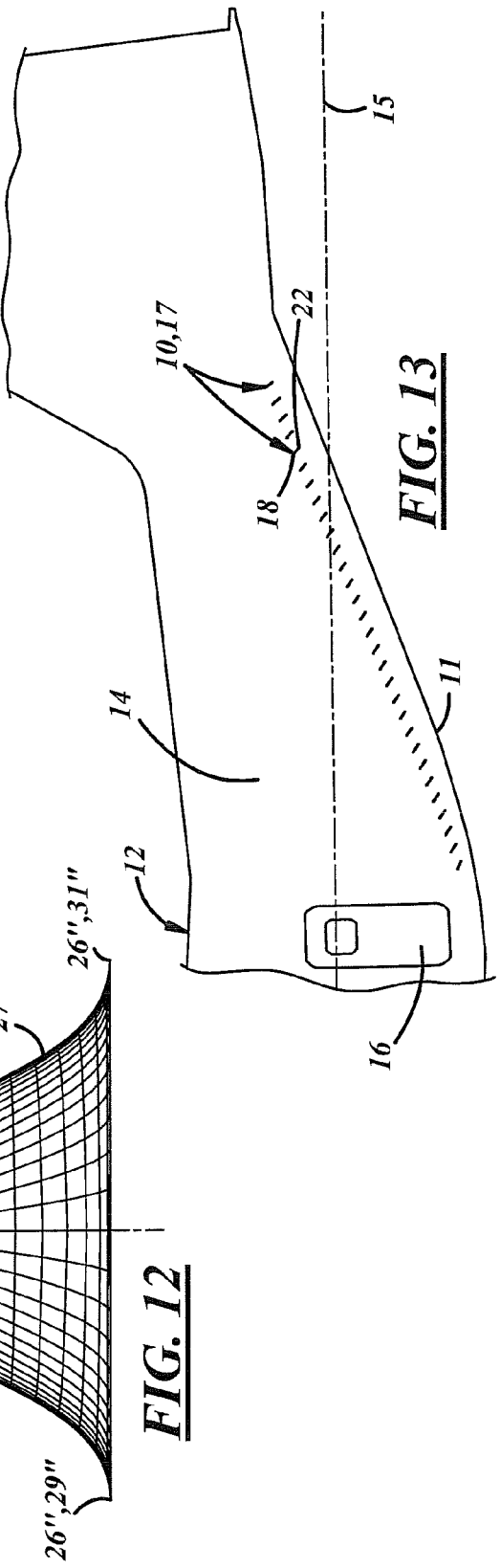

VORTEX GENERATION DEVICE

CROSS-REFERENCES TO RELATED APPLICATIONS

U.S. patent application Ser. No. 12/406,819, filed Mar. 18, 2009, is incorporated herein by reference.

STATEMENT REGARDING FEDERALLY SPONSORED RESEARCH OR DEVELOPMENT

Not applicable.

BACKGROUND OF THE INVENTION

1. Field of the Invention

This invention relates generally to a vortex generation device for reducing drag on an upswept aircraft fuselage afterbody.

2. Description of the Related Art Including Information Disclosed Under 37 CFR 1.97 and 1.98

Many cargo aircraft are designed with relatively short landing gear to provide low ground clearance to facilitate direct cargo onload and offload without the use of scissors trucks and other cargo lift devices. Such aircraft are also often designed to include an upswept aft fuselage section that positions an empennage of the aircraft clear of the ground when the aircraft are rotated for takeoff and when the aircraft are landing at slow speed and high angle of attack on approaches to short landing fields. An aft wall of the upswept aft fuselage section of such aircraft typically includes a large main cargo door that opens downward about a horizontal axis adjacent a cargo floor of the aircraft to form a ramp that may be used to onload and offload of cargo and personnel when the aircraft is on the ground. The main cargo door may also be opened in flight to offload cargo via paradrop or low altitude extraction.

The upswept aft fuselage wall typically contributes significant drag to the aircraft because vortices are formed when air sweeping laterally inward around the corners of the upswept aft fuselage meets air flowing aft and upward from underneath the fuselage. These vortices tend to cause flow separation to occur earlier than it otherwise would, imparting significant profile drag. Since profile drag tends to rise with the square of airspeed its effects become more pronounced at higher airspeeds. Those effects include increased fuel consumption rates and decreases in range, endurance, and airspeed.

Fin-like projections mounted on the mold line of an aircraft fuselage are known to generate vortices. However, when such projections are included aft of an aft side parachute jump door of an aircraft, they can snag parachute drop lines of paratroopers or parachuted cargo.

BRIEF SUMMARY OF THE DISCLOSURE

A vortex generation device is provided for reducing drag on an upswept aircraft fuselage afterbody. The device may include a vortex generator vane that extends longitudinally from along an aircraft fuselage adjacent an upswept afterbody of the fuselage. The vortex generator vane is configured and positioned to reduce drag on the upswept aircraft fuselage afterbody by developing vortices that counteract vortices generated along the upswept fuselage afterbody. The vortex generator vane may be disposed aft of a side paratrooper jump door in the fuselage and may include a rounded spine and a rounded leading end that are faired smoothly into a mold line of the fuselage to avoiding snagging drop lines of paratroopers (or other cargo) egressing through the side jump door, while still generating vortices similar to those that a blade vane would generate.

A transverse profile of the vane may be defined by a curve having a width approximately twice its height.

The transverse profile of the vane may be defined by a curve having slope discontinuities of less than approximately 30 degrees.

The transverse profile of the vane may include a break in slope of approximately 20 degrees along a center line of the spine to promote better vortex generation while remaining smooth enough to prevent snagging of static lines.

The transverse profile of the vane may be generally bell-shaped and the leading and trailing ends of the vane may be defined by the same curve defining the transverse profile of the vane.

The curve defining the transverse profile of the vane may be a cubic spline curve to insure that the entire shape of the vane has generally continuous slopes and that the entire vane is smooth and continuous in slope away from a surface junction with the aircraft fuselage.

The vortex generator vane may comprise a single piece solid flexible member and may be attached to the aircraft fuselage by an adhesive layer disposed between the aircraft fuselage and an underside of the vane. This precludes the need to engineer each vane to precisely fit the contours of the fuselage mold line to which each vane is to be affixed.

A plurality of the vortex generator vanes may be arrayed along and just forward of an upswept afterbody side edge of the aircraft fuselage. Each vortex generator vane of the plurality of vanes may be oriented in a leading-end-up attitude relative to what the direction of local air flow would be in the absence of vortex generation devices and with the aircraft flying at max range airspeed.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which:

FIG. 1 is an orthogonal view of a vortex generation device vane constructed according to the invention with surface topography illustrated by imaginary grid lines;

FIG. 2 is a bottom view of the vane of FIG. 1 as the vane would be observed if mounted on and extending laterally from the side of an aircraft fuselage, the surface topography of the vane being illustrated by imaginary grid lines;

FIG. 3 is a side view of the vane of FIG. 1 as the vane would be observed if mounted on and extending laterally from the side of an aircraft fuselage, the surface topography of the vane being illustrated by imaginary grid lines;

FIG. 4 is a partial cross-sectional front view of a leading end of the vane of FIG. 1 adhered to the skin of an aircraft by a glue layer and with surface topography of the vane illustrated by imaginary grid lines;

FIG. 5 is an orthogonal view of a second vortex generation device vane embodiment having surface topography illustrated by imaginary grid lines;

FIG. 6 is a bottom view of the vane of FIG. 5 as the vane would be observed if mounted on and extending laterally from the side of an aircraft fuselage, the surface topography of the vane being illustrated by imaginary grid lines;

FIG. 7 is a side view of the vane of FIG. 5 as the vane would be observed if mounted on and extending laterally from the side of an aircraft fuselage, the surface topography of the vane being illustrated by imaginary grid lines;

FIG. 8 is a front view of a leading end of the vane of FIG. 5 with surface topography illustrated by imaginary grid lines;

FIG. 9 is an orthogonal view of a third vortex generation device vane embodiment having surface topography illustrated by imaginary grid lines;

FIG. 10 is a side view of the vane of FIG. 9 as the vane would be observed if mounted on and extending laterally from the side of an aircraft fuselage, the surface topography of the vane being illustrated by imaginary grid lines;

FIG. 11 is a bottom view of the vane of FIG. 9 as the vane would be observed if mounted on and extending laterally from the side of an aircraft fuselage, the surface topography of the vane being illustrated by imaginary grid lines;

FIG. 12 is a front view of a leading end of the vane of FIG. 9 with surface topography illustrated by imaginary grid lines;

FIG. 13 is a schematic side view of an array of the vanes of FIG. 1 extending laterally from along one side of the fuselage of an aircraft between an upswept tail section of the fuselage and a side jump door in the fuselage.

DETAILED DESCRIPTION OF INVENTION EMBODIMENT(S)

A vortex generation device for reducing drag on an upswept aircraft fuselage afterbody is generally indicated at 10 in the Figures. As shown in FIG. 13, arrays of the devices 10 may be carried on one or more surfaces of an aircraft fuselage such as along rounded corners or side edges 11 of an upswept afterbody 14 of an aircraft fuselage 12, aft of one or more side paratrooper jump doors 16 that may be disposed forward of the upswept afterbody 14, and aft of aircraft wings that extend laterally from the aircraft fuselage 12.

Each of the devices 10 may comprise a vortex generator vane, a first embodiment of which is generally indicated at 17 in FIGS. 1-4 and 13. A second vane embodiment is generally shown at 17' in FIGS. 5-8 and a third vane embodiment is shown at 17" in FIGS. 9-12. Reference numerals having the designation prime (') in FIGS. 5-8 and reference numerals having the designation double-prime (") in FIGS. 9-12 indicate alternative configurations of elements that also appear in the first embodiment of FIGS. 1-4 and 13. Unless indicated otherwise, where a portion of the following description uses a reference numeral to refer to FIG. 1-4 or 13, that portion of the description applies equally to elements designated by primed numerals in FIGS. 5-8 and by double-primed numerals in FIGS. 9-12.

As best shown in FIG. 13, the vortex generator vane 17 of each device 10 may extend in a generally longitudinal leading-end-up attitude relative to what the direction of local air flow would be in the absence of vortex generation devices and with the aircraft flying at max range airspeed. In other words, the angle of attack (AOA) of each vane 17 is positive relative to what the direction of local airflow would be if the vane were not present and the aircraft were flying at maximum range airspeed and AOA, i.e., the airspeed and AOA at which the aircraft is able to fly the greatest distance in level flight at a given altitude with a given amount of fuel on board.

The vane AOA may be determined by first performing a computational fluid dynamics (CFD) analysis of the aircraft without vortex generator vanes being mounted, selecting locations for mounting vortex generator vanes, and calculating surface normal vectors for each such location. The velocity vector is then measured at each such location from the no-vortex generator vane CFD solution at a distance from the outer surface of the aircraft fuselage approximately equal to the height of the vortex generator vane to be mounted. The vortex generator vane orientation is then defined at each location by rotating each velocity vector about its local surface normal vector an angle equal to the desired AOA, such that the flow is turned around side edges 11 of the upswept fuselage afterbody 14 in a direction or sense opposite that of vortices normally formed when air moving aft around the side edges 11 meets air moving up an upswept afterbody 14 from under the fuselage 12 of the aircraft.

As is, again, best shown in FIG. 13, the devices 10 may be arrayed in selected locations along and just forward of and adjacent the upswept fuselage afterbody side edges 11 and may be configured and positioned to reduce drag created by the upswept fuselage afterbody 14 by developing vortices that counteract vortices normally generated by the flow of air around the upswept fuselage afterbody 14, thus delaying flow separation. The vortices created by the devices 10 thus cancel the normally formed vortices and maintain flow attachment for a greater distance around the side edges 11 of the upswept fuselage afterbody 14. The devices 10 may be positioned and arrayed as disclosed in U.S. patent application Ser. No. 12/406,819, which is assigned to the assignee of the present invention and is incorporated herein by reference. Alternatively, the devices 10 may be positioned anywhere a parachute drop line might come into contact with the devices.

As shown in FIGS. 1-4, each vortex generator vane 17 has a leading end 18 that may be disposed aft of the side paratrooper jump door 16 when the vane is mounted on an aircraft fuselage 12 as shown in FIG. 13. Each vane 17 may also have a rounded spine 20 that, along with the leading end 18 and a trailing end 22, is faired smoothly into the fuselage 12 when the vane 17 is mounted on an aircraft fuselage 12. The smooth fairing and rounded shape of the spine 20 of each vane 17 prevents the vanes 17 from snagging drop lines of paratroopers (or other cargo) egressing via a side jump door 16 of an aircraft, while still generating vortices similar to those that a flat blade-shaped vane would generate if it were positioned as shown in the applicant's U.S. patent application Ser. No. 12/406,819.

Each vane 17 may extend or protrude from along an outer mold line of the fuselage 12 of the aircraft in such a way as to present a smooth elongated bump shape. As best shown in FIG. 4, the profile of each vane 17 may be generally bell-shaped having an excurvate portion 25 along its spine 20 and incurvate portions 27 on either side of the spine 20 blending toward respective upper and lower edges 29, 31 of each vane 17. The profile of each vane 17 may be defined by a curve having slope discontinuities of less than approximately 30 degrees. The transverse profile of each vane 17 may be generally constant along an elongated longitudinally extending midsection 24 of each vane 17 as best shown in FIG. 3.

Each vane 17 may have a height of about 1.5 cm (0.60 inch) as measured from an outer surface of the fuselage afterbody 14 to an outer surface of the spine 20 of each vane 17 in a direction normal to the outer surface of the fuselage afterbody 14. However in other embodiments, each vane may be between about 0.6 and 5.1 cm (0.25 and 2 inches) in height and, preferably, between about 0.8 and 3 cm (0.3 and 1.2 inches) in height. Optionally, the height of the vanes 10 in an array may vary between about 1.5 and 3 cm (0.6 and 1.2 inches). In certain embodiments, the respective sizes of the vanes 10 may depend on the size of the aircraft and may be scaled to size accordingly.

Each vane 17 may have a length of about 25.4 cm (10 inches). However, in other embodiments each vane may be less than 63.5 cm (25 inches) in length, and preferably between about (5 and 20 inches) in length. In certain embodiments, each vane may be between about 12.7 and 38.1 cm (5 and 15 inches) in length, and preferably between approximately 20.3 and 30.5 cm (8 and 12 inches) in length.

The width of each vane 17 may be approximately twice its height and both its width and its height may be uniform along a midsection 24 of the vane 17. However, in other embodiments, at least one vane may have a width and/or height different than those of an adjacent vane, and the width and/or height of each vane may vary along each vane's length.

In certain embodiments, the plurality of vanes 17 may have a uniform geometry and dimensions. In other embodiments, at least one vane may have a geometry and dimensions that are different from those of at least one other vane.

As best shown in FIG. 4, the curve defining at least a portion of the transverse profile of each vane may be a cubic spline curve. This ensures that the entire shape of each vane 17 has generally continuous slopes and that the entire vane 17 is smooth and continuous in slope away from a surface junction 26 with the aircraft fuselage 12.

As shown in FIGS. 3 and 4, the leading end 18 of each vane 17 may be defined by the same curve that defines its transverse profile or cross-section. That same curve may be "rotated" about a leading end axis 21 of the vane 17 to define a rounded 3D half-bell shape.

As is also shown in FIGS. 3 and 4, the trailing end 22 of each vane 17 may be defined by the same curve that defines the transverse profile of the vane. That curve may be "rotated" about a trailing end axis 23 of each vane 17 to define a rounded 3D half-bell shape.

However, as shown in the second embodiment in FIGS. 5-8, the leading and trailing ends 21', 22' of at least one vane 17' may be more tapered or shallow than the curve defining the transverse profile of the vane 17', with the trailing end 22' of the vane 17' being defined by curves that taper more gradually than the curve or curves defining the leading end 21' of the vane 17'. In other words, the fairing of the trailing end 22' of the vane 17' may be more elongated and gradual than the fairing of the leading end 21' of the vane 17'. A base of the leading end 21' of each vane 17' shown in FIGS. 5-8 may have the shape of a 2:1 ellipse and a base of the trailing end 22' of each vane 17' may have the shape of a 3:1 ellipse.

As shown in the third embodiment in FIGS. 9-12, the excurvate portion 25' of the spine 20' of at least one vane 17" may include a break 32 in the slope of the vane cross section or transverse profile. As best shown in FIG. 12, the break may be approximately 20 degrees off of smooth and may be disposed along a center line of the spine 20'. Such a break in the slope may be included to promote better vortex generation while remaining smooth enough to prevent snagging of static lines.

As best shown in FIG. 4, each vane 17 may be constructed as a single piece solid flexible member. Each vane 17 may comprise a polymeric material and/or may comprise any one or more other known suitable elastic materials.

As is also best shown in FIG. 4, each vane 17 may be attached to the fuselage 12 of an aircraft via adhesion, e.g., by applying an adhesive layer 30 to a flat base 28 of each vane 17 and then applying each vane 17 to the fuselage 12 in a desired location and attitude such that the adhesive layer 30 is disposed between the aircraft fuselage 12 and the base 28 of each vane 17.

In other embodiments the vanes 17 need not be solid but may instead be hollow. Each vane 17 may alternatively be constructed as a multiple piece assembly rather than as a single piece, or according to any other suitable known structure and may be attached to the fuselage of an aircraft via fasteners or any other suitable means. The vanes 17 may alternatively be built into the aircraft fuselage, e.g., constructed with fuselage skin panels as single unitary pieces, or built integrally into aircraft fuselage skin panels.

Among other merits, a vane 17 constructed according to these specifications and positioned along side edges of an upswept afterbody of an aircraft as shown in the applicant's U.S. patent application Ser. No. 12/406,819, produces a vortex effect similar to that generated by more conventionally shaped vanes, i.e., a reduction in profile drag, which reduces fuel consumption rates and increases range, endurance, and airspeed capability. In addition, the rounded contours of vanes constructed as disclosed above will avoid interference with snag-prone items, such as parachute static lines, that extend from side egress doors of the aircraft, and will avoid compromising low observable characteristics of the aircraft.

This description, rather than describing limitations of an invention, only illustrates an embodiment of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. A vortex generation device for reducing drag on an upswept aircraft fuselage afterbody, the device comprising:
    an aircraft fuselage having an upswept afterbody and a side paratrooper jump door disposed forward of the upswept afterbody; and
    a vortex generator vane that extends longitudinally from along an outer mold line of the aircraft fuselage adjacent an upswept afterbody of the fuselage and that is configured and positioned to reduce drag on the upswept aircraft fuselage afterbody by developing vortices that counteract vortices generated along the upswept fuselage afterbody;
    the vortex generator vane being disposed downstream of the side paratrooper jump door and having a spine and leading end that are faired smoothly into the fuselage.

2. A vortex generation device as defined in claim 1 in which a transverse profile of the vane has a width approximately twice its height.

3. A vortex generation device as defined in claim 1 in which a transverse profile of the vane is generally constant along an elongated midsection of the vane.

4. A vortex generation device as defined in claim 1 in which a transverse profile of the vane is defined by a curve having slope discontinuities of less than approximately 30 degrees.

5. A vortex generation device as defined in claim 1 in which a transverse profile of the vane is generally bell-shaped.

6. A vortex generation device as defined in claim 1 in which a transverse profile of the vane includes a break in slope of approximately 20 degrees along a center line of the spine.

7. A vortex generation device as defined in claim 1 in which the leading end of the vane is defined by the same curve defining a transverse profile of the vane.

8. A vortex generation device as defined in claim 1 in which a trailing end of the vane is defined by the same curve defining a transverse profile of the vane.

9. A vortex generation device as defined in claim 1 in which the curve defining a transverse profile of the vane is a cubic spline curve.

10. A vortex generation device as defined in claim 1 in which the vortex generator vane comprises a single piece solid flexible member.

11. A vortex generation device as defined in claim 10 in which the vortex generator vane is attached to the aircraft fuselage by an adhesive layer disposed between the aircraft fuselage and an underside of the vane.

12. A vortex generation device as defined in claim 1 in which a plurality of the vortex generator vanes are arrayed along and just forward of an upswept afterbody side edge of the aircraft fuselage.

13. A vortex generation device as defined in claim 12 in which each vortex generator vane of the plurality of vanes is oriented in a leading-end-up attitude relative to what the direction of local air flow would be in the absence of vortex generation devices and with the aircraft flying at max range airspeed.

14. A vortex generation device for reducing drag on an upswept aircraft fuselage afterbody, the device comprising:
- an aircraft fuselage having port and starboard side walls and an upswept afterbody blending around port and starboard upswept afterbody corners into the fuselage side walls;
- port and starboard vortex generator vane arrays disposed along the respective port and starboard upswept side edges of the upswept fuselage afterbody;
- each vane of each vane array being oriented to turn flow around the upswept side edges in a direction or sense opposite that of vortices normally formed when air moving around the upswept side edges from the fuselage side walls meets air moving up the upswept afterbody from under the fuselage; and
- each vane of each vane array having a spine and a leading end shaped to fair smoothly into a mold line of the upswept fuselage afterbody side edge from which the vane extends.

15. A vortex generation device as defined in claim 14 in which a transverse profile of the vane has a width approximately twice its height.

16. A vortex generation device as defined in claim 14 in which a transverse profile of the vane is generally constant along an elongated midsection of the vane.

17. A vortex generation device as defined in claim 14 in which a transverse profile of the vane is defined by a curve having slope discontinuities of less than approximately 30 degrees.

18. A vortex generation device as defined in claim 14 in which a transverse profile of the vane is generally bell-shaped.

19. A vortex generation device as defined in claim 14 in which a transverse profile of the vane includes a break in slope of approximately 20 degrees along a center line of the spine.

20. A vortex generation device as defined in claim 14 in which at least one of the leading and trailing ends of the vane is defined by the same curve that defines a transverse profile of the vane.

21. A vortex generation device as defined in claim 14 in which the curve defining a transverse profile of the vane is a cubic spline curve.

22. A vortex generation device as defined in claim 14 in which the vortex generator vane comprises a single piece solid flexible member.

* * * * *